United States Patent
Usa et al.

(10) Patent No.: US 11,747,526 B2
(45) Date of Patent: Sep. 5, 2023

(54) MOLDED ARTICLE AND METHOD FOR MANUFACTURING MOLDED ARTICLE

(71) Applicant: DAICEL CORPORATION, Osaka (JP)

(72) Inventors: Daisuke Usa, Tokyo (JP); Masaki Hayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 659 days.

(21) Appl. No.: 16/754,418

(22) PCT Filed: Jan. 17, 2019

(86) PCT No.: PCT/JP2019/001300
§ 371 (c)(1),
(2) Date: Apr. 8, 2020

(87) PCT Pub. No.: WO2019/146494
PCT Pub. Date: Aug. 1, 2019

(65) Prior Publication Data
US 2021/0199860 A1 Jul. 1, 2021

(30) Foreign Application Priority Data
Jan. 29, 2018 (JP) .................................. 2018-012795

(51) Int. Cl.
*B60Q 3/14* (2017.01)
*G02B 5/02* (2006.01)
*B29C 33/38* (2006.01)
*B29D 11/00* (2006.01)

(52) U.S. Cl.
CPC ........ *G02B 5/0221* (2013.01); *B29C 33/3842* (2013.01); *B29D 11/0073* (2013.01); *B60Q 3/14* (2017.02); *G02B 5/0268* (2013.01); *B60K 2370/33* (2019.05)

(58) Field of Classification Search
CPC ..... G02B 5/0221; B60Q 3/14; B29D 11/0073
See application file for complete search history.

(56) References Cited

U.S. PATENT DOCUMENTS

| 2009/0002831 | A1 | 1/2009 | Mikami et al. | |
| 2011/0228392 | A1* | 9/2011 | Yang | G02B 5/124 |
| | | | | 359/530 |
| 2020/0166678 | A1* | 5/2020 | Sugawara | G02B 5/0268 |

FOREIGN PATENT DOCUMENTS

| JP | 9-193332 A | 7/1997 |
| JP | 2005-227407 A | 8/2005 |
| JP | 2008-46496 A | 2/2008 |
| JP | 2014-112223 A | 6/2014 |

(Continued)

OTHER PUBLICATIONS

English translation of International Preliminary Report on Patentability dated May 4, 2020, in PCT/JP2019/001300.

*Primary Examiner* — Joseph L Williams
(74) *Attorney, Agent, or Firm* — Birch, Stewart, Kolasch & Birch, LLP

(57) ABSTRACT

A molded article includes a light transmission portion disposed in superposition with a display portion of a display device, the light transmission portion transmitting light from the display portion. Recesses and protrusions are formed on a surface of the light transmission portion opposite to the display portion, and thus the surface has anti-glare properties.

19 Claims, 11 Drawing Sheets

(56) References Cited

FOREIGN PATENT DOCUMENTS

| JP | 2016-99425 A | 5/2016 |
| JP | 2017-15812 A | 1/2017 |
| JP | 2017-109350 A | 6/2017 |
| WO | WO 95/31737 A1 | 11/1995 |
| WO | WO 2017/203916 A | 11/2017 |

* cited by examiner

MOLDED ARTICLE AND METHOD FOR MANUFACTURING MOLDED ARTICLE

TECHNICAL FIELD

The present invention relates to a molded article and a method for manufacturing a molded article.

BACKGROUND ART

Molded articles are used in components and the like used in automobile dashboards. A molded article is manufactured, for example, by a method of injection molding a resin material or, as disclosed in Patent Document 1, by a method of curing a photocurable resin material.

A molded article may be disposed in superposition with, for example, a display device of various types, such as a flat panel display (FPD) or a measuring device (hereinafter, simply referred to as a display device). In this case, the molded article covers the display device and includes a light transmission portion transmitting light from the display device to allow a display content of the display device to be visually recognized from outside.

CITATION LIST

Patent Document

Patent Document 1: JP 8-34023 A

SUMMARY OF INVENTION

Technical Problem

In the molded article including the light transmission portion, external light impinging on a surface of the light transmission portion may cause difficulty in visually recognizing the display content of the display device displayed through the light transmission portion. Such a problem is relatively noticeable, for example, in applications where the molded article is often exposed to external light.

Thus, an object of the present invention is, in a molded article including a light transmission portion transmitting light from a display device, to prevent difficulty, due to external light, in viewing a display content of the display device displayed through the light transmission portion.

Solution to Problem

To solve the above problem, a molded article according to an aspect of the present invention includes a light transmission portion disposed in superposition with a display device, the light transmission portion transmitting light from the display portion, in which recesses and protrusions are formed on a surface of the light transmission portion opposite to the display portion, and thus the surface has anti-glare properties.

According to the above configuration, recesses and protrusions are formed on the surface of the light transmission portion of the molded article opposite to the display portion, thus the surface has anti-glare properties (also referred to as non-glare properties or a glare resistance), and thus external light when impinging on the surface of the light transmission portion is diffusely reflected on the surface of the light transmission portion. Thus, this can prevent the difficulty due to external light in viewing a display content of the display device displayed through the light transmission portion.

A center line average surface roughness (Ra) on the surface of the light transmission portion may be set to a value in a range of 0.01 µm or greater and 2.0 µm or less. In addition, an average peak-valley interval (Sm) on the surface of the light transmission portion may be set to a value in a range of 1 µm or greater and 500 µm or less. Furthermore, an average inclination angle (θa) on the surface of the light transmission portion may be set to a value in a range of 0.001° or greater and 10° or less. Still more, a haze value on the surface of the light transmission portion may be set to a value in a range of 0.5% or greater and 95% or less.

At least any of the center line average surface roughness, the average peak-valley interval, the average inclination angle, or the haze value on the surface of the light transmission portion is thus set to a predetermined value, and this can enhance the effect of diffusely reflecting external light on the surface of the light transmission portion. Thus, this can impart good anti-glare properties to the surface of the light transmission portion by forming recesses and protrusions on the surface to impart anti-glare properties to the surface.

A maximum thickness dimension of the light transmission portion may be set to a value in a range of 0.2 mm or greater and 50 mm or less. Also in such a case where a maximum thickness dimension of the light transmission portion is set to a value in a somewhat large range, it is possible to prevent the difficulty due to external light in viewing a display content of the display device displayed through the light transmission portion.

An absolute value of skewness (Ssk) on the surface of the light transmission portion may be set to a value of 3 or less, and kurtosis (Sku) on the surface of the light transmission portion is set to a value of 10 or less.

In a case where the skewness and the kurtosis on the surface of the light transmission portion are each thus set to predetermined values, recesses and protrusions can be formed with high precision by forming the recesses and protrusions on the surface of the light transmission portion to impart anti-glare properties to the surface. In addition, in transferring the recesses and protrusions from the surface of the original mold or the master mold to the surface of the light transmission portion, the above settings can facilitate transferring the surface shape of the original mold or the master mold having good anti-glare properties to the surface of the light transmission portion.

Furthermore, the display device has a plurality of pixels located side by side along the surface of the display portion, and a standard deviation of a luminance distribution of the light transmission portion may be set to a value in a range of 3 or greater and 25 or less.

When recesses and protrusions are present on the surface of the light transmission portion, the light from the display portion is refracted by the recesses and protrusions, or pixels of the display portion appear to be enlarged by a lens effect of the recesses and protrusions, and this may generate sparkle on the surface of the light transmission portion, causing difficulty in viewing the image.

Here, the standard deviation of the luminance distribution of the light transmission portion indicates a degree of variation in luminance of the display portion on the surface of the light transmission portion. Thus, the standard deviation is an objective index that can quantitatively evaluate the sparkle of the surface of the light transmission portion. Thus, the value of the standard deviation is set to a value in a range of 3 or greater and 25 or less, and this can prevent the difficulty due to external light in viewing a display content of the display device displayed through the light transmission portion, and also can prevent the difficulty in viewing an image due to the sparkle of the surface of the light transmission portion.

At least the light transmission portion may be a film insert molded portion. The light transmission portion is thus formed as a film insert molded portion, and this can efficiently impart anti-glare properties to the surface of the light transmission portion.

In addition, a method for manufacturing a molded article according to an aspect of the present invention includes: casting a surface of an original mold to form a master mold, in which recesses and protrusions are formed on the surface of the original mold and thus the surface has anti-glare properties; adhering an uncured material to a surface of the master mold; and curing the uncured material adhered to the surface of the master mold to form a molded article including a light transmission portion disposed in superposition with a display portion of a display device, the light transmission portion transmitting light from the display portion and having a surface to which a shape of the surface of the master mold is transferred.

According to the above method, a molded article including a light transmission portion having a surface to which a shape of a surface of an original mold is transferred can be manufactured relatively easily by casting a surface of the original mold to form a master mold, in which recesses and protrusions are formed on the surface of the original mold and thus the surface has anti-glare properties; and adhering an uncured material to a surface of this master mold and curing the uncured material. The molded article thus manufactured is disposed to position the surface of the light transmission portion having anti-glare properties on an opposite side to the display portion of the display device, and this can achieve the effects of the molded article described above.

In the adhering, a thermoplastic resin may be integrally molded with a laminated member, in a state of disposing the master mold inside a mold and disposing the laminated member with a coating layer containing the uncured material formed on one surface, in superposition with the master mold to adhere the coating layer to the surface of the master mold, by injecting a thermoplastic resin into the inside of the mold from an opposite side to the master mold side of the laminated member.

According to the above method, the thermoplastic resin is molded integrally with the laminated member, and this can efficiently manufacture the molded article including the light transmission portion having anti-glare properties imparted to the surface by the coating layer having a surface to which a shape of the surface of the master mold is transferred.

In addition, a method for manufacturing a molded article according to an aspect of the present invention includes: adhering an uncured material to a surface of an original mold, in which recesses and protrusions are formed on the surface and thus the surface has anti-glare properties; and curing the uncured material adhered to the surface of the original mold to form a molded article including a light transmission portion disposed in superposition with a display portion of a display device, the light transmission portion transmitting light from the display portion and having a surface to which a shape of the surface of the original mold is transferred.

According to the above method, a molded article including a light transmission portion having a surface to which a shape of the surface of the original mold is transferred can be manufactured relatively easily by adhering an uncured material to a surface of an original mold, in which recesses and protrusions are formed on the surface and thus the surface has anti-glare properties, and curing the uncured material. In particular, the molded article can be obtained directly from the original mold without using the master mold, and thus the molded article can be manufactured quickly and at low cost.

In addition, the molded article thus manufactured is disposed to position the surface of the light transmission portion having anti-glare properties on an opposite side to the display portion of the display device, and this can achieve the effects of the molded article described above.

A film member may be used as the original mold. Such use of a film member having anti-glare properties on the surface as the original mold facilitates handling of the original mold, and thus the molded article can be more easily manufactured.

The film member containing a plurality of resin components and having a co-continuous phase structure formed by phase separation of the plurality of resin components may be used. Using such a film member as the original mold allows recesses and protrusions resulting from the co-continuous phase structure to be transferred to the surface of the light transmission portion of the molded article with high precision.

Thus, the haze value on the surface of the light transmission portion of the molded article is appropriately set, and this can impart anti-glare properties to the surface and also can prevent the difficulty in viewing an image due to the sparkle of the surface of the light transmission portion, when using the display device having a plurality of pixels located side by side along the surface of the display portion.

The film member containing a matrix resin and a plurality of fine particles dispersed in the matrix resin may be used. Such use of the film member having recesses and protrusions formed on the surface by the plurality of fine particles as the original mold allows the recesses and protrusions to be formed on the surface of the light transmission portion of the molded article with high precision and ease.

The uncured material may contain a thermosetting resin material. In addition, the uncured material may contain a photocurable resin material. Such use of the uncured material containing a thermosetting resin material or a photocurable resin material allows the curing to be carried out easily, and this can manufacture the molded article relatively quickly.

Advantageous Effects of Invention

An embodiment of the present invention can prevent, in the molded article including the light transmission portion transmitting light from the display device, difficulty due to external light in viewing a display content of the display device displayed through the light transmission portion.

DESCRIPTION OF EMBODIMENTS

Hereinafter, each embodiment will be described with reference to the drawings.

First Embodiment

Molded Article

Figure 1:
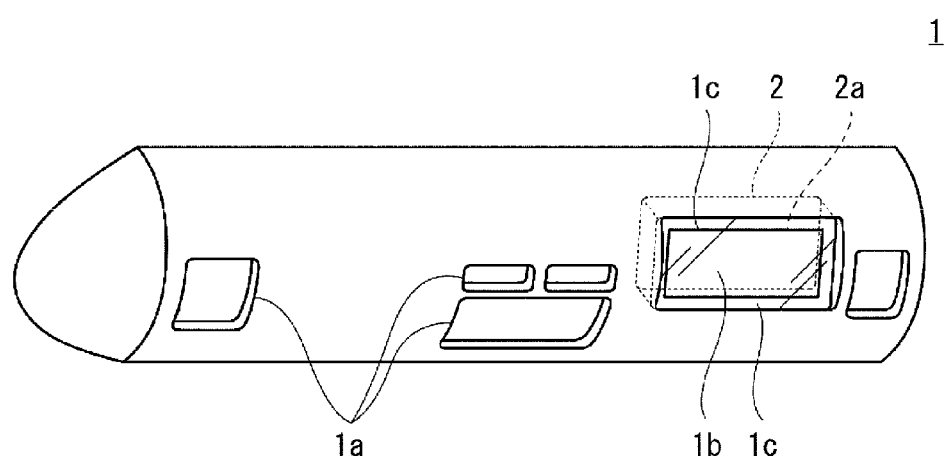
FIG. 1 is an external view of a molded article according to a first embodiment.
Figure 2:
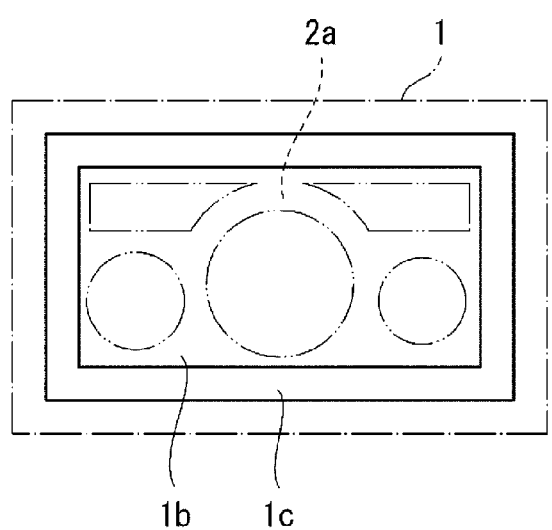
FIG. 2 is a front view of a light transmission portion of FIG. 1.
Figure 3:
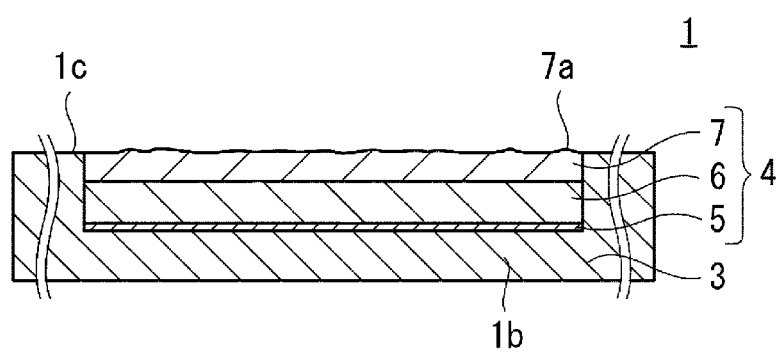
FIG. 3 is a cross-sectional view of the light transmission portion of FIG. 1.

FIG. 1 is an external view of a molded article according to a first embodiment. FIG. 2 is a front view of a light transmission portion 1b of FIG. 1. FIG. 3 is a cross-sectional view of the light transmission portion 1b of FIG. 1. The molded article 1 illustrated in FIG. 1 is, as an example, a part used in an automobile dashboard. The molded article 1 is, as an example, a resin molded article. In the present embodiment, the molded article 1 is a resin product having a shape formed using a mold. In addition, the molded article 1 is configured as a rigid body.

As illustrated in FIGS. 1 and 2, the molded article 1 includes a plurality of opening portions 1a, a light transmission portion 1b, and a frame-shaped portion 1c. The opening portions 1a are disposed at a plurality of separated positions in the molded article 1. Various switches and blowing ports of an air conditioner are disposed inside the opening portions 1a to be exposed to the vehicle interior.

The light transmission portion 1b is provided on the driver seat side of the molded article 1. The light transmission portion 1b is disposed in superposition with the display portion 2a of the display device 2 to transmit light from the display portion 2a. The display device 2 is disposed with the display portion 2a directed toward the vehicle interior side via the molded article 1. The display portion 2a functions, as an example, as an instrument panel as an example. The light transmission portion 1b transmits a display content of the display portion 2a, and thus the driver can visually recognize the display content.

As illustrated in FIG. 2, the light transmission portion 1b is formed, as an example, in a rectangular shape in a front view. The display portion 2a has a plurality of pixels located side by side along the surface of the display portion 2a. The display portion 2a displays, through the plurality of pixels, various types of information, such as traveling speed, to the driver. The periphery of the light transmission portion 1b is surrounded by the frame-shaped portion 1c.

Here, micro recesses and protrusions are formed on the surface of the light transmission portion 1b opposite to the display portion 2a of the light transmission portion 1b (hereinafter, simply referred to as the surface of the light transmission portion 1b). In contrast, a surface of the frame-shaped portion 1c opposite to the display portion 2a (hereinafter simply referred to as the surface of the frame-shaped portion 1c) is formed smoothly. In the molded article 1, the light transmission portion 1b and the frame-shaped portion 1c thus differ in the surface shape. In addition, the surface of the frame-shaped portion 1c is formed smoothly, and thus the molded article 1 is decoratively treated.

The frame-shaped portion 1c is, as an example, colored. The frame-shaped portion 1c may be transparent. As another example, the light transmission portion 1b and the frame-shaped portion 1c are integrally formed. As a result, the surface of the light transmission portion 1b is smoothly continuous with the surface of the molded article 1 adjacent to the light transmission portion 1b (here, the surface of the frame-shaped portion 1c). In the present embodiment, the surface of the light transmission portion 1b is seamlessly connected to the surface of the molded article 1 adjacent to the light transmission portion 1b.

The surface of the light transmission portion 1b is thus smoothly continuous with the surface of the molded article 1 adjacent to the light transmission portion 1b, and thus this improves the appearance quality in the light transmission portion 1b and the peripheral region of the light transmission portion 1b of the molded article 1.

In addition, the light transmission portion 1b and the frame-shaped portion 1c may be individually configured and then connected. Furthermore, the light transmission portion 1b and the frame-shaped portion 1c of the molded article 1 and other portions of the molded article 1 may be individually configured. In this case, the light transmission portion 1b and the frame-shaped portion 1c are configured as independent molded articles separated from the molded article 1. Moreover, the light transmission portion 1b of the molded article 1 and other parts of the molded article 1 may be individually configured. In this case, the light transmission portion 1b is configured as an independent molded article separated from the molded article 1.

As illustrated in FIG. 3, the light transmission portion 1b includes a base member 3 and a laminated member 4. The light transmission portion 1b is formed by sequentially laminating the base member 3 and the laminated member 4 from the display portion 2a side of the display device 2.

The base member 3 is a main member of the molded article 1. The base member 3 is formed, as an example, by injection molding a thermoplastic resin. In the present embodiment, the molded article 1 is a film insert molded body in which the base member 3 and the laminated member 4 are integrally molded. In the molded article 1, at least the light transmission portion 1b is configured as a film insert molded portion.

The region of the base member 3 superposed with the light transmission portion 1b is transparent. When the base member 3 is made of a thermoplastic resin, examples of the thermoplastic resin include a polyolefin, a styrene resin, an acrylic resin, a vinyl chloride resin, a polyvinyl alcohol resin, a polyacetal, a polyester, a polycarbonate, a polyamide, a polyimide, a polysulfone resin, a polyphenylene ether resin, a polyphenylene sulfide resin, a fluororesin, and a cellulose derivative. These thermoplastic resins can be used alone or in combination of two or more.

Among these thermoplastic resins, in terms of excellent balance between transparency and strength, a cyclic polyolefin, a polyalkylene arylate (such as a polyethylene terephthalate (PET) and a polyethylene naphthalate (PEN)), a polymethyl methacrylate resin, a bisphenol-A type polycarbonate, cellulose esters, and the like are preferred.

In addition, the base member 3 may be constituted of a thermosetting resin. In this case, examples of the thermosetting resin include a phenolic resin, a melamine resin, a urea resin, a benzoguanamine resin, a silicone resin, an epoxy resin, an unsaturated polyester, a vinyl ester resin, and a polyurethane. These thermosetting resins can be used alone or in combination of two or more.

Among these thermosetting resins, in terms of excellent balance between transparency and strength, an epoxy resin, an unsaturated polyester, a silicone resin, and a polyurethane are preferred.

In addition, the base member 3 may be constituted of a photocurable resin. In this case, examples of the photocurable resin include a photocurable polyester, a photocurable acrylic resin, a photocurable epoxy(meth)acrylate, and a photocurable urethane (meth)acrylate. These photocurable resins can be used alone or in combination of two or more. Among these photocurable resins, in terms of excellent balance between transparency and strength, a photocurable acrylic resin and a photocurable urethane (meth)acrylate are preferred.

The laminated member 4 is transparent and has an adhesive layer 5, a base layer 6, and an anti-glare layer 7. The laminated member 4 is formed by sequentially laminating the adhesive layer 5, the base layer 6, and the anti-glare layer 7 from the display portion 2a side of the display device 2.

The adhesive layer 5 adheres the laminated member 4 to the base member 3. The base layer 6 supports the anti-glare layer 7. Examples of a material of the base layer 6 include any of a polycarbonate (PC), a polyethylene (PE), and a polyethylene terephthalate (PET). The base layer 6 is constituted, as an example, of a single film. The base layer 6 may be constituted of a film laminate in which a plurality of films is laminated.

The anti-glare layer 7 is the outermost layer of the light transmission portion 1b on the opposite side to the display portion 2a of the display device 2. That is, a surface 7a of the anti-glare layer 7 opposite to the base layer 6 side is the surface of the light transmission portion 1b. The surface 7a of the anti-glare layer 7 has anti-glare properties described below. The anti-glare layer 7 is constituted, as an example, of a photocurable resin. In addition, the anti-glare layer 7 may be constituted of a material similar to that of the base member 3.

Furthermore, when the base layer 6 can be adhered to the base member 3 without using the adhesive layer 5, the adhesive layer 5 may be omitted. Moreover, a layer other than the anti-glare layer 7, such as a photocurable resin layer, may be disposed on the base member 3 side of the base layer 6.

The light transmission portion 1b has a thickness dimension of at least 0.4 mm or greater. A maximum thickness dimension of the light transmission portion 1b is set to a value in a range, as an example, of 0.4 mm or greater and 50 mm or less. That is, the light transmission portion 1b, having the maximum thickness dimension of 0.4 mm or greater, is formed to have a certain degree of rigidity. The value of this maximum thickness dimension is, as an example, more preferably a value in a range of 0.5 mm or greater and 50 mm or less and even more preferably a value in a range of 1 mm or greater and 50 mm or less.

The light transmission portion 1b has a surface on which recesses and protrusions are formed and thus the surface has anti-glare properties. The surface of the light transmission portion 1b reduces reflection of external light compared to the surface of the frame-shaped portion 1c. This improves visibility in viewing the display portion 2a of the display device 2 through the light transmission portion 1b. Specifically, the surface of the display portion 2a has anti-glare properties by defining each of the following settings.

That is, a center line average surface roughness (Ra) on the surface of the light transmission portion 1b is set to a value in a range of 0.01 μm or greater and 2.0 μm or less. The value of this center line average surface roughness (Ra) is, as an example, more preferably a value in a range of 0.02 μm or greater and 1.5 μm or less and even more preferably a value in a range of 0.04 μm or greater and 1.0 μm or less.

An average peak-valley interval (Sm) on the surface of the light transmission portion 1b is set to a value in a range of 1 μm or greater and 500 μm or less. This average peak-valley interval (Sm) indicates an average interval of the recesses and protrusions. The average peak-valley interval (Sm) represents an arithmetic average value of intervals between many recesses and protrusions, which is determined by extracting a portion of the roughness curve defined in JIS B 0601 (1994) by a reference length in its average line direction, and determining a sum of lengths of the average lines each corresponding to an interval between a top of one peak and a bottom of a valley adjacent to the peak in this extracted portion. The value of this average peak-valley interval (Sm) is, as an example, more preferably a value in a range of 5 μm or greater and 300 μm or less and even more preferably a value in a range of 10 or greater and 200 or less.

In addition, an average inclination angle (θa) on the surface of the light transmission portion 1b is set to a value in a range of 0.001° or greater and 10.0° or less. The value of this average inclination angle (θa) is, as an example, more preferably a value in a range of 0.1° or greater and 4.0° or less and even more preferably a value in a range of 0.1° or greater and 3.0° or less.

The center line average surface roughness (Ra), the average peak-valley interval (Sm), and the average inclination angle (θa) referred to herein are defined by JIS B 0601 (1994 Edition). The average inclination angle (θa) is a value defined by $\theta a = \tan^{-1} \Delta a$.

Aa is a value obtained by dividing a sum (h1+h2+h3+ . . . +hn) of differences (height h) each between the top of the protrusion and the lowest point of the recess adjacent to each other in the roughness curve defined in JIS B 0601 by the reference length L of the roughness curve. That is, Δa is expressed by a formula $\Delta a = (h1+h2+h3+ \ldots +hn)/L$.

In addition, a haze value on the surface of the light transmission portion 1b is set to a value in a range of 0.5% or greater and 95% or less. The value of this haze value is, as an example, more preferably a value in a range of 0.5% or greater and 60.0% or less and even more preferably a value in a range of 0.5% or greater and 50.0% or less.

In addition, an arithmetic average roughness (Sa) on the surface of the light transmission portion 1b is set to a value in a range of 10 nm or greater and 2000 nm or less. Here, the arithmetic average roughness (Sa) indicates an average of absolute values of differences in heights of a plurality of points relative to an average surface of the surface.

The value of this arithmetic average roughness (Sa) is, as an example, more preferably a value in a range of 20 nm or greater and 1500 nm or less and even more preferably a value in a range of 40 nm or greater and 1000 nm or less. In another example, the value of the arithmetic average roughness (Sa) is more preferably a value in a range of 40 nm or greater and 300 nm or less and in particular even more preferably a value in a range of 70 nm or greater and 150 nm or less.

In addition, a root mean square height (Sq) on the surface of the light transmission portion 1b is set to a value in a range of 50 nm or greater and 500 nm or less. Here, the root mean square height (Sq) corresponds to a parameter of a standard deviation of the distance from an average surface.

The value of this root mean square height (Sq) is, as an example, more preferably a value in a range of 60 nm or greater and 300 nm or less and even more preferably a value in a range of 70 nm or greater and 200 nm or less (in particular 80 nm or greater and 150 nm or less).

In addition, an absolute value of skewness (Ssk) on the surface of the light transmission portion 1b is set to a value of 3 or less, and kurtosis (Sku) on the surface of the light transmission portion 1b is set to a value of 10 or less.

Here, the skewness (Ssk) is an index to evaluate symmetry (degree of bias) of height distribution of the surface and indicates symmetry of the peak portion and the valley portion with respect to a predetermined average line in the middle. The absolute value of the skewness (Ssk) set to a value of 3 or less allows the surface of the light transmission portion 1b to be favorably formed using an original mold 20 and the master mold 25 described below.

The value of this absolute value of the skewness (Ssk) is, as an example, more preferably a value of 2.5 or less, even more preferably a value of 2 or less, and still more preferably a value of 1 or less. In another example, the value of the absolute value of the skewness (Ssk) is more preferably a value in a range of 0.5 or less, even more preferably a value in a range of 0.3 or less, and still more preferably a value in a range of 0.1 or less.

In addition, the kurtosis (Sku) is an index to evaluate a sharpness (degree of peakedness) of the height distribution of the surface. The kurtosis (Sku) set to a value of 10 or less can facilitate manufacturing the molded article 1 including the light transmission portion 1b having high anti-glare properties and an effect of reducing sparkle. This also prevents generation of micro cracks in the original mold 20 and the master mold 25 during handling and can appropriately manufacture the molded article 1.

A value of an absolute value of this kurtosis (Sku) is, as an example, more preferably a value in a range of 0.1 or greater and 10 or less, even more preferably a value in a range of 0.5 or greater and 8 or less, and still more preferably a value in a range of 2 or greater and 6 or less (in particular 3 or greater and 5 or less).

In addition, a total light transmittance on the surface of the light transmission portion 1b is set to a value in a range of 70% or greater and 100% or less. The value of this total light transmittance is more preferably a value in a range of 80% or greater and 100% or less and even more preferably a value in a range of 90% or greater and 100% or less.

In addition, a transmission image clarity measured with an image clarity meter using an optical comb with a width of 0.5 mm is set to a value in a range of 40% or greater and 100% or less. Here, the transmission image clarity is a measure for quantifying blurriness and distortion of light transmitted through the light transmission portion 1b. The value of the transmission image clarity measured with an image clarity meter using an optical comb with a width of 0.5 mm is more preferably a value in a range of 60 or greater and 95% or less and even more preferably a value in a range of 70% or greater and 90% or less.

As described above, in the molded article 1, the surface of the light transmission portion 1b has anti-glare properties, and thus external light when impinging on the surface of the light transmission portion 1b is diffusely reflected on the surface of the light transmission portion 1b. Thus, this can prevent the difficulty due to external light in viewing a display content of the display device 2 displayed through the light transmission portion 2.

In addition, the surface of the molded article 1 itself has anti-glare properties, and thus, for example, this eliminates the need for affixing an additional member, such as a film having anti-glare properties, on the surface of the light transmission portion 1b of the molded article 1 manufactured. Thus, this can impart anti-glare properties to the surface of the molded article 1 at a relatively low cost. Furthermore, an additional member other than the molded article 1, if disposed, would cause a difference in level on the surface of the molded article 1, leading to accumulation of foreign matter, such as trash, in this difference in level and an appearance problem; however, the molded article 1 can avoid such problems.

In addition, when the molded article 1 includes the light transmission portion 1b in a partial region, a region other than the light transmission portion 1b of the molded article 1 can be subjected to a surface treatment, such as painting, as necessary. This can facilitate improving the appearance quality of the molded article 1.

In addition, in the molded article 1, at least any of the center line average surface roughness (Ra), the average peak-valley interval (Sm), the average inclination angle (θa), or the haze value on the surface of the light transmission portion 1b is set to a predetermined value, and this can enhance the effect of diffusely reflecting external light on the surface of the light transmission portion 1b. Thus, this can impart good anti-glare properties to the surface of the light transmission portion 1b by forming recesses and protrusions on the surface to impart anti-glare properties to the surface.

In addition, in the molded article 1, a maximum thickness dimension of the light transmission portion 1b is a value in a range of 0.4 mm or greater and 50 mm or less. Also in such a case where a maximum thickness dimension of the light transmission portion 1b is set to a value in a somewhat large range, it is possible to prevent the difficulty due to external light in viewing a display content of the display device 2 displayed through the light transmission portion 1b.

In addition, in the molded article 1, the skewness (Ssk) and the kurtosis (Sku) on the surface of the light transmission portion 1b are each set to predetermined values, and thus recesses and protrusions can be formed with high precision by forming the recesses and protrusions on the surface of the light transmission portion 1b to impart antiglare properties to the surface. Furthermore, when transferring the recesses and protrusions from the surface of the original mold 20 or the master mold 25 described below to the surface of the light transmission portion 1b, the above settings can facilitate transferring the surface shape of the original mold 20 or the master mold 25 having good anti-glare properties, to the surface of the light transmission portion 1b.

In addition, in the molded article 1, a standard deviation of a luminance distribution of the light transmission portion 1b is set to a value in a range of 3 or greater and 25 or less. Here, the standard deviation of the luminance distribution of the light transmission portion 1b indicates a degree of variation in luminance of the display portion 2a on the surface of the light transmission portion 1b. Thus, the standard deviation is an objective index that can quantitatively evaluate the sparkle of the surface of the light transmission portion 1b. Thus, the value of the standard deviation is set to a value in a range of 3 or greater and 25 or less, and this can prevent the difficulty due to external light in viewing a display content of the display device 2 displayed through the light transmission portion 2, and also can prevent the difficulty in viewing an image due to the sparkle of the surface of the light transmission portion 1b.

Here, the value of the standard deviation is, as an example, more preferably a value in a range of 3 or greater and 15 or less, even more preferably a value in a range of 3 or greater and 10 or less, and still more preferably a value in a range of 3 or greater and 8 or less.

In addition, in the molded article 1, at least the light transmission portion 1b is a film insert molded portion. The light transmission portion 1b is thus formed as a film insert molded portion, and this can efficiently impart anti-glare properties to the surface of the light transmission portion 1b.

The anti-glare properties of the surface of the light transmission portion 1b can be measured with a predetermined measurement apparatus using, for example, the light transmission portion 1b or a test piece prepared by casting the surface shape of the light transmission portion 1b.

Specifically, the center line average surface roughness (Ra), the average peak-valley interval (Sm), and the average inclination angle (θa) can be measured using a contact surface roughness meter (Surfcomb 570A, available from Tokyo Seimitsu Co., Ltd.).

In addition, the skewness (Ssk), the kurtosis (Sku), an arithmetic average roughness (Sa), and the root mean square height (Sq) can be measured in accordance with ISO25178 using a scanning white interference microscope (VertScan, available from Hitachi High-Tech Science Corporation).

Further, the haze value and the total light transmittance can be measured in accordance with JIS K7105 using a haze meter (NDH-5000W, available from Nippon Denshoku Industries Co., Ltd.). Furthermore, the transmission image clarity can be measured in accordance with JIS K7105 using an image clarity meter (ICM-1T, available from Suga Test Instruments, Co., Ltd.).

Moreover, the standard deviation of the luminance distribution of the light transmission portion 1b can be measured with a sparkle measurement apparatus 10 described below using, for example, the light transmission portion 1b or a test piece prepared by casting the surface shape of the light transmission portion 1b.

Still more, the display portion 2a of the display device 2 may be provided with a touch panel device. In this case, the surface of the light transmission portion 1b can be an operation input surface receiving an operation input of the touch panel device. The surface of the light transmission portion 1b having anti-glare properties improves swiping properties when the driver operates the touch panel device and allows a better operation of the touch panel device than when the operation input screen is smooth.

Method for manufacturing molded article

Figure 4:
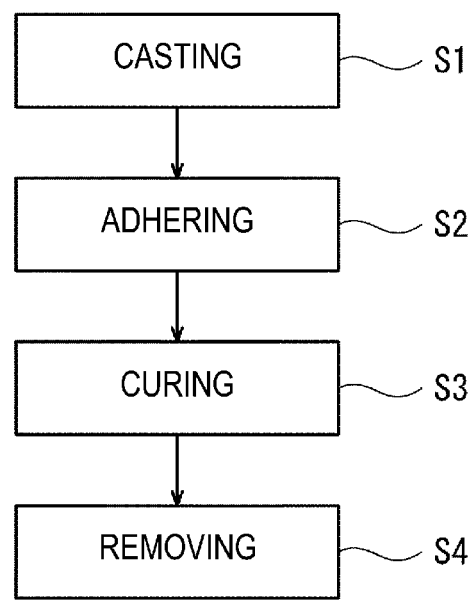
FIG. 4 is a manufacturing flow diagram for the molded article of FIG. 1.

FIG. 4 is a manufacturing flow diagram for the molded article 1 of FIG. 1. FIGS. 5A to 5D are diagrams illustrating a method of manufacturing the molded article 1 of FIG. 1. FIG. 5 illustrates states in which the light transmission portion 1b of the molded article 1 is manufactured.

As illustrated in FIG. 4, the method for manufacturing the molded article 1 includes casting S1, adhering S2, curing S3, and removing S4. In the casting S1, a master mold 25 is formed by casting a surface 22a of an original mold 20, in which recesses and protrusions are formed on the surface 22a and thus the surface 22a has anti-glare properties. In the adhering S2, an uncured material is adhered to a surface 25a of the formed master mold 25 (see FIG. 5A).

In the curing S3, an uncured material 8 adhered to the surface 25a of the master mold 25 is cured to form the molded article 1 including the light transmission portion 1b disposed in superposition with the display portion 2a of the display device 2, the light transmission portion 1b transmitting light from the display portion 2a and having a surface to which a shape of the surface 25a of the master mold 25 is transferred. In the removing S4, the molded article 1 is removed from predetermined molds 25 to 27 (see FIG. 5C).

Here, in the adhering S2 of the first embodiment, in a state of disposing the master mold 25 inside a first mold 26 and disposing a laminated member 28 with a coating layer 9 containing the uncured material 8 formed on one surface, in superposition with the master mold 25 to adhere the coating layer 9 to the surface 25a of the master mold 25, a thermoplastic resin 30 is injected into the inside of the first mold 26 from an opposite side to the master mold 25 side of the laminated member 28 to mold the thermoplastic resin 30 integrally with the laminated member 28.

Specifically, an operator first prepares the original mold 20 having anti-glare properties on the surface 22a. As this original mold 20, as an example, a film member having anti-glare properties on the surface is used. The film member includes a base layer 23 and a coating layer 22 formed on one surface of the base layer 23.

The coating layer 22 has a structure with fine recesses and protrusions. The coating layer 22 of the present embodiment contains a plurality of resin components and has a structure with fine recesses and protrusions, which is formed of a co-continuous phase structure formed by phase separation of the plurality of resin components, as described in detail below as an example. In addition, in the present embodiment, the surface of the coating layer 22 opposite to the base layer 23 side, is the surface 22a of the original mold 20. Anti-glare properties imparted to the surface of the light transmission portion 1b of the molded article 1 are determined by the shape of the surface 22a of this original mold.

The operator then produces the master mold 25 by casting the surface 22a of the original mold 20. In the present embodiment, the master mold 25 is produced by an electroforming (electrocasting) method. Specifically, as an example, a metal thin film is formed on the surface 22a of the original mold 20 to impart conductivity to the surface 22a. Thereafter, the original mold 20 is immersed in a plating solution, and a plated film is formed on the surface 22a of the original mold 20 by an electroplating processing.

After a film thickness dimension of the plated film reaches a predetermined value (as an example, a value in a range of 10 μm or greater and 30 mm or less), the original mold 20 is removed from the plating solution (FIG. 5A), and the plated film is removed from the original mold 20. The casting S1 is thus carried out, and the plated film formed by casting the shape of the surface 22a of the original mold 20 is obtained as the master mold 25.

According to the electrocasting method, the master mold 25 having the shape of the surface 22a of the original mold 20 can be replicated with high precision (e.g., a precision of 1 μm or less) by electrodepositing an electrolyzed metal ion on the surface of the original mold 20 in the plating solution. In addition, when the surface 22a of the original mold 20 has conductivity, the surface 22a is directly electroplated without forming the metal thin film on the surface 22a of the original mold 20 to form the master mold 25.

Furthermore, the operator prepares the uncured material 8, which is a material of the molded article 1. The uncured material 8 is specifically a material of the anti-glare layer 7. In the present embodiment, the uncured material 8 containing a photocurable resin material and having moderate fluidity is used. As an example, the uncured material 8 contains a first component contributing to hardness of the anti-glare layer 7 and a second component contributing to flexibility of the anti-glare layer 7.

Examples of the first component include a component containing a urethane acrylate, pentaerythritol tetraacrylate, and a pentaerythritol acrylate. As the first component, for example, a NK Oligo UA-1100H available from Shin-Nakamura Chemical Co., Ltd. can be used.

Examples of the second component include a component containing a (meth)acrylic ester polymer, an acrylate monomer, a urethane acrylate, and a polymeric acrylate. As the second component, for example, at least any of UNIDIC ERS-830 available from DIC Corporation, UNIDIC ERS-524 available from DIC Corporation, or UV Clear IMH-002 available from Natoco Co., Ltd. can be used.

Next, the operator disposes the adhesive layer 5 on one surface of the base layer 6 to produce the laminated member 28 in which the coating layer 9 containing the uncured material 8 is disposed on the other surface of the base layer 6. This laminated member 28 corresponds to a film member (an original of a shape-imparting film member) for film-insert molding the light transmission portion 1b.

Figure 5A:
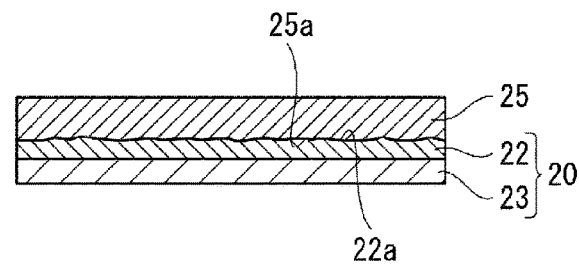
FIGS. 5A to 5D are cross-sectional views illustrating a method of manufacturing the molded article of FIG. 1.
Figure 5B:
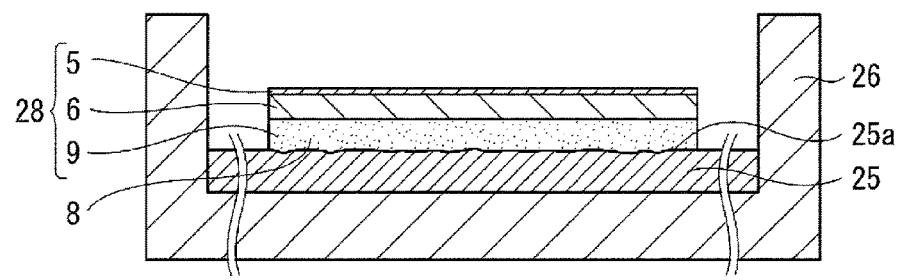

In addition, the operator disposes the master mold 25 inside the first mold 26 (FIG. 5B). At this time, the master mold 25 is disposed with the surface 25a directed toward the internal space of the first mold 26, the surface 25a being formed by casting the surface 22a of the original mold 20. The operator disposes the laminated member 28 inside the first mold 26. At this time, the laminated member 28 is disposed to adhere the coating layer 9 (the uncured material 8) disposed on the laminated member 28 to the surface 25a of the master mold 25. The adhering S2 is thus carried out.

Figure 5C:
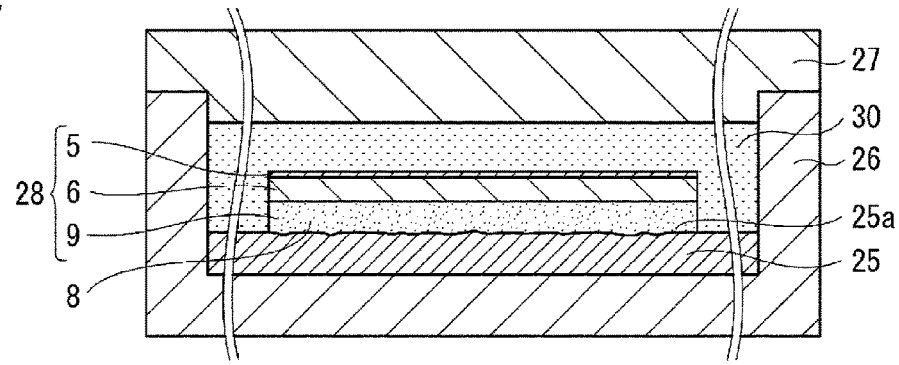

Next, the operator disposes a second mold 27 in combination with the first mold 26 (FIG. 5C). In this state, the thermoplastic resin 30 in a molten state is injected into the inside of the molds 26 and 27 to bring the thermoplastic resin 30 into contact with the laminated member 28. As a result, the thermoplastic resin 30 is molded with the molds 26 and 27. The thermoplastic resin 30 cools and hardens to form the base member 3.

The base member 3 is adhered to the laminated member 28 with the adhesive layer 5 of the laminated member 28. In addition, although not illustrated, a portion other than the light transmission portion 1b of the molded article 1 is formed by injection molding the base member 3 inside the molds 26 and 27.

Next, the operator removes the base member 3 from inside the molds 26 and 27 together with laminated member 28. At this time, the shape of the surface 25a of the master mold 25 is transferred to the surface of the coating layer 9 (the uncured material 8) of the laminated member 28. Here, the coating layer 9 (the uncured material 8) of the laminated member 28 has a certain degree of hardness, and thus when the coating layer 9 (the uncured material 8) of the laminated member 28 is removed from the master mold 25, the surface shape of the coating layer 9 (the uncured material 8) is less likely to deform.

Figure 5D:
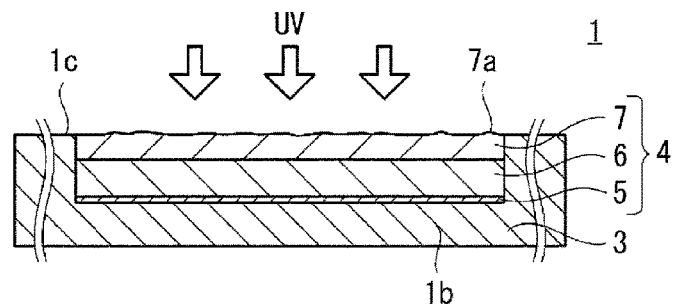

The operator cures the uncured material 8 of the laminated member 28. In the present embodiment, the operator cures the uncured material 8 of the laminated member 28 by ultraviolet irradiation (FIG. 5D). The uncured material 8 of the laminated member 28 is cured to form the anti-glare layer 7, thereby producing the molded article 1. The curing S3 and the removing S4 are thus carried out. The manufacturing method described above can provide the molded article 1 including the light transmission portion 1b having a surface shape that is a positive pattern to the surface shape of the original mold 20.

As described above, according to the manufacturing method of the present embodiment, the molded article 1 including the light transmission portion 1b having a surface to which a shape of the surface 22a of the original mold 20 is transferred can be manufactured relatively easily by casting the surface 22a of the original mold 20 to form the master mold 25, in which recesses and protrusions are formed on the surface 22a and thus the surface 22a has anti-glare properties; and adhering the uncured material 8 to the surface 25a of this master mold 25 and curing the uncured material 8. The molded article 1 thus manufactured is disposed to position the surface of the light transmission portion 1b having anti-glare properties on an opposite side to the display portion 2a of the display device 2, and this can achieve the effects of the molded article 1 described above.

In addition, as the original mold 20, a film member can be used. That is, use of a film member having anti-glare properties on the surface 22a as the original mold 20 facilitates handling of the original mold 20, and thus the molded article 1 can be further easily manufactured.

In addition, in the adhering S2, the thermoplastic resin 30 is molded integrally with the laminated member 28, and this can efficiently manufacture the molded article 1 including the light transmission portion 1b having anti-glare properties imparted to the surface by the coating layer 9 having a surface to which a shape of the surface 25a of the master mold 25 is transferred.

In addition, the present embodiment uses a film member as the original mold 20, the film member containing a plurality of resin components and having a co-continuous phase structure formed by phase separation of the plurality of resin components. Using such a film member as the original mold 20 allows recesses and protrusions resulting from the co-continuous phase structure to be transferred to the surface of the light transmission portion 1b of the molded article 1 with high precision.

Thus, the haze value on the surface of the light transmission portion 1b of the molded article 1 is appropriately set, and this can impart anti-glare properties to the surface and also can prevent the difficulty in viewing an image due to the sparkle of the surface of the light transmission portion 1b, when using the display device 2 having a plurality of pixels located side by side along the surface of the display portion 2a.

Next, a modified example of the manufacturing method of the present embodiment will be described. In this modified example, the uncured material 8 contains a thermosetting resin material. In the curing S3 in this case, the uncured material 8 is cured by heating with a heater.

In the first embodiment, such use of the uncured material 8 containing a thermosetting resin or a photocurable resin allows the curing to be carried out easily, and this can manufacture the molded article relatively quickly.

Although the manufacturing method of the first embodiment is exemplified by a method of forming the master mold 25 by an electroforming method, the method for forming the master mold 25 is not limited to this example. For example, the method for forming the master mold 25 may include a method of casting the surface 22a of the original mold 20 with a silicone resin or the like.

In addition, the uncured material 8 may be cured in a state of disposing the base member 3 and the laminated member 28 inside the molds 26 and 27. At this time, when the uncured material 8 contains a photocurable resin material, the uncured material 8 can be cured, for example, by irradiating the uncured material 8 from the base member 3 side in a state in which the second mold 27 is removed from the first mold 26.

Coating Layer of Original Mold

Hereinafter, the coating layer 22 included in the original mold 20 will be described in detail. The surface of the coating layer 22 (the surface 22a of the original mold 20) opposite to the base layer 23, has, as an example, similar anti-glare properties to that of the surface of the light transmission portion 1b of the molded article 1. In addition, the coating layer 22 also functions as a hard coat (HC) layer that protects the surface of the base layer 23.

Here, the surface 22a of the original mold 20 may have anti-glare properties slightly different from the surface of the light transmission portion 1b of the molded article 1. In this case, for example, the absolute value of the skewness (Ssk) of the surface 22a of the coating layer 22 may be set to a value in a range of 0.5 times or greater and 2.0 times or less the absolute value of the skewness (Ssk) of the surface of the light transmission portion 1b of the molded article 1 (and the surface 25a of the master mold 25).

The coating layer 22 has a plurality of long narrow protrusions formed on the surface 22a, as an example, by a phase separation structure of a plurality of resin components. The long narrow protrusions are branched and form a co-continuous phase structure in a dense state. The coating layer 22 exhibits anti-glare properties by the plurality of long narrow protrusions and recesses located between adjacent long narrow protrusions. The surface 22a of the coating layer 22 has the long narrow protrusions formed in a substantially mesh shape and thus has a mesh structure, in other words, a plurality of irregular loop structures that are continuous or partially missing.

Specifically, one or more long narrow protrusions having a predetermined length dimension are present per mm² on the surface 22a of the coating layer 22. This length dimension of the long narrow protrusions is set to a value of 100 µm or greater in the present embodiment. The value of this length dimension of the long narrow protrusions is, as an example, more preferably a value of 200 µm or greater and even more preferably a value of 500 µm or greater.

The total length dimension referred to herein is the total length of the sum of the length dimension of each branch branched in the continuous long narrow protrusions. In addition, a plurality of the long narrow protrusions may be present; however, when the entire surface of the surface 22a has a co-continuous phase structure, only one long narrow protrusion may present on the surface 22a.

In the co-continuous phase structure formed by the long narrow protrusion, meshes, each having approximately the same diameter, are arranged in an irregular shape. An average diameter of the mesh included in the co-continuous phase structure (an average value of the long diameter and the short diameter when the mesh in the co-continuous phase structure is in an anisotropic shape, such as an elliptical shape or a rectangular shape) is set to a value in a range of 1 µm or greater and 70 µm or less in the present embodiment.

The value of this average diameter is, as an example, more preferably a value in a range of 2 µm or greater and 50 µm or less and even more preferably a value in a range of 5 µm or greater and 30 µm or less. In another example, the value of this average diameter is more preferably a value in a range of 1 µm or greater and 40 µm or less, even more preferably a value in a range of 3 µm or greater and 35 µm or less, and still more preferably a value in a range of 10 µm or greater and 30 µm or less.

The shape of the long narrow protrusion in the surface 22a in a planar view is string-like having a curved portion in one or more portions. An average width of the long narrow protrusions is set to a value in a range of 0.1 µm or greater and 30 µm or less in the present embodiment.

The value of the average width of the long narrow protrusions is, as an example, more preferably a value in a range of 0.1 µm or greater and 20 µm or less, even more preferably a value in a range of 0.1 µm or greater and 15 µm or less, and still more preferably a value in a range of 0.1 µm or greater and 10 µm or less (in particular, 0.1 µm or greater and 5 µm or less).

In another example, the value of the average width of the long narrow protrusions is more preferably a value in a range of 1.0 µm or greater and 20 µm or less, even more preferably a value in a range of 1.0 µm or greater and 15 µm or less, and still more preferably a value in a range of 1.0 µm or greater and 10 µm or less. Here, the long narrow protrusions with a too large average width may cause sparkle or a blurred character, and the long narrow protrusions with a too small average width may reduce the anti-glare properties.

An average height of the long narrow protrusions is set to a value in a range of 0.05 µm or greater and 10 µm or less in the present embodiment. The value of the average height of the long narrow protrusions is, as an example, more preferably a value in a range of 0.07 µm or greater and 5 µm or less and even more preferably a value in a range of 0.09 µm or greater and 3 µm or less (in particular, 0.1 µm or greater and 2 µm or less).

An area occupied by the long narrow protrusions on the surface 22a is set to a value in a range of 10% or greater and less than 100% of the total surface area of the surface 22a in the present embodiment. The value of the area occupied by the long narrow protrusions on the surface 22a is, as an example, more preferably a value in a range of 30% or greater and less than 100% of the total surface area of the surface 22a and even more preferably a value in a range of 50% or greater and less than 100% (in particular, 70% or greater and less than 100%) of the total surface area of the surface 22a. Here, if the area between the long narrow protrusions is too small, the anti-glare properties may be likely to decrease, and if the area is too large, sparkle or a blurred character may be caused.

Here, the dimension, shape (presence or absence of branching), and area of the long narrow protrusions of the surface 22a can be measured and evaluated based on the two-dimensional shape observed in a micrograph. In addition, each of the average value, average width, and average height described above is an average value of measurements measured at any 10 locations on the surface 22a.

The formation of the co-continuous phase structure on the surface 22a of the coating layer 22 prevents formation of a protrusion in a lens shape (sea-island shape). Such a shape of the surface 22a of the coating layer 22 is transferred to the surface of the light transmission portion 1b in the molded article 1.

In addition, the plurality of long narrow protrusions may be independent of each other or may be connected to each other. The phase separation structure and the co-continuous phase structure of the coating layer 22 are formed by carrying out spinodal decomposition (wet spinodal decomposition) from a liquid phase using a predetermined raw material solution. For details of the surface shape and the manufacturing method of the coating layer 22, reference can be made to the description of, for example, JP 6190581 B.

Here, the plurality of resin components contained in the coating layer 22 is any phase-separable resin components, but in terms of obtaining a coating layer 22 on which a long narrow protrusion is formed and which has high scratch resistance, the coating layer 22 preferably contains a polymer and a curable resin.

The polymer contained in the coating layer 22 can be exemplified by thermoplastic resins. The thermoplastic resin can be exemplified by styrene resins, (meth)acrylate polymers, organic acid vinyl ester resins, vinyl ester resins, halogen-containing resins, olefin resins (including alicyclic olefin resins), polycarbonate resins, polyester resins, polyamide resins, thermoplastic polyurethane resins, polysulfone resins (such as polyether sulfone and polysulfone), polyphenylene ether resins (such as a polymer of 2,6-xylenol), cellulose derivatives (such as cellulose esters, cellulose carbamates, and cellulose ethers), silicone resins (such as polydimethylsiloxane and polymethylphenylsiloxane), and rubbers or elastomers (diene rubbers, such as polybutadiene and polyisoprene; styrene-butadiene copolymers; acrylonitrile-butadiene copolymers; acrylic rubber; urethane rubber; and silicone rubber). These thermoplastic resins can be used alone or in combination of two or more.

In addition, the polymer can also be exemplified by polymers having a functional group involved in a curing reaction or polymers having a functional group reacting with a curable compound. The polymer may have a functional group in the main chain or side chain.

The functional group can be exemplified by condensable groups, reactive groups (e.g., such as a hydroxyl group, an acid anhydride group, a carboxyl group, an amino group or an imino group, an epoxy group, a glycidyl group, or an isocyanate group), and polymerizable groups (e.g., $C_{2-6}$ alkenyl groups, such as vinyl, propenyl, isopropenyl, butenyl, and allyl groups; $C_{2-6}$ alkynyl groups, such as ethynyl, propynyl, and butynyl groups; $C_{2-6}$ alkenylidene groups, such as a vinylidene group; or groups having any of these polymerizable groups (such as a (meth)acryloyl group)). Among these functional groups, polymerizable groups are preferred.

Furthermore, the coating layer 22 may contain a plurality of types of polymers. Each of these polymers may be phase separable by spinodal decomposition from a liquid phase or may be mutually immiscible. The combination of a first polymer and a second polymer included in the plurality of types of polymers is not particularly limited, but polymers mutually immiscible at or near a processing temperature can be used.

For example, when the first polymer is a styrene resin (such as a polystyrene or a styrene-acrylonitrile copolymer), the second polymer can be exemplified by a cellulose derivative (e.g., a cellulose ester, such as cellulose acetate propionate), a (meth)acrylic resin (such as polymethyl methacrylate), an alicyclic olefin resin (such as a polymer containing norbornene as a monomer), a polycarbonate resin, or a polyester resin (such as a poly $C_{2-4}$ alkylene arylate copolyester).

In addition, for example, when the first polymer is a cellulose derivative (e.g., a cellulose ester, such as cellulose acetate propionate), the second polymer can be exemplified by a styrene resin (such as polystyrene or a styrene-acrylonitrile copolymer), a (meth)acrylic resin, an alicyclic olefin resin (such as a polymer containing norbornene as a monomer), a polycarbonate resin, or a polyester resin (such as a poly $C_{2-4}$ alkylene arylate copolyester).

The plurality of types of polymers may include at least a cellulose ester (e.g., a cellulose $C_{2-4}$ alkyl carboxylic ester, such as cellulose diacetate, cellulose triacetate, cellulose acetate propionate, or cellulose acetate butyrate).

Here, the phase separation structure of the coating layer 22 is fixed by curing of a precursor of the curable resin contained in the plurality of resin components by an active energy ray (such as ultraviolet light or an electron beam), heat, or the like in manufacturing the coating layer 22. In addition, such a curable resin imparts scratch resistance and durability to the coating layer 22.

In terms of achieving scratch resistance of the coating layer 22, at least one polymer included in the plurality of types of polymers is preferably a polymer having a functional group in a side chain, the functional group capable of reacting with a curable resin precursor. The polymer forming the phase separation structure may include a thermoplastic resin or an additional polymer in addition to the two mutually immiscible polymers described above. A weight ratio M1/M2 of a weight M1 of the first polymer and a weight M2 of the second polymer, and a glass transition temperature of the polymers can be appropriately set.

The curable resin precursor can be exemplified by curable compounds having a functional group, the functional group reacting by an active energy ray (such as ultraviolet light or an electron beam), heat, or the like, the curable compounds curing or crosslinking through this functional group to form a resin (in particular, a cured resin or a crosslinked resin).

Such a compound can be exemplified by thermosetting compounds or thermosetting resins (low molecular weight compounds having an epoxy group, a polymerizable group, an isocyanate group, an alkoxysilyl group, a silanol group, or the like (e.g., such as an epoxy resin, an unsaturated polyester resin, a urethane resin, and a silicone resin)), and photocurable (ionizing radiation curable) compounds curing by ultraviolet light, an electron beam, or the like (UV curable compounds, such as photocurable monomers and oligomers).

Preferred curable resin precursors can be exemplified by photocurable compounds curing in a short time by ultraviolet light, an electron beam, or the like. Among these photocurable compounds, in particular, UV curable compounds are practical. To improve resistance, such as scratch resistance, the photocurable compound preferably has 2 or more (preferably from 2 to 15 and more preferably from 4 to approximately 10) polymerizable unsaturated bonds per molecule. Specifically, the photocurable compound is preferably epoxy (meth)acrylate, urethane (meth)acrylate, polyester (meth)acrylate, silicone (meth)acrylate, or a multifunctional monomer having at least two polymerizable unsaturated bonds.

The curable resin precursor may contain a curing agent according to the type of the curable resin precursor. For example, the thermosetting resin precursor may contain a curing agent, such as an amine and a polyvalent carboxylic acid, and the photocurable resin precursor may contain a photopolymerization initiator. The photopolymerization initiator can be exemplified by commonly used components, such as, for example, acetophenones or propiophenones, benzyls, benzoins, benzophenones, thioxanthones, and acylphosphine oxides.

In addition, the curable resin precursor may contain a curing accelerator. For example, the photocurable resin precursor may contain a photocuring accelerator, such as, for example, a tertiary amine (such as dialkylaminobenzoate), a phosphine photopolymerization accelerator, or the like.

In manufacturing the coating layer 22, at least two components of the polymer and the curable resin precursor contained in a solution, which is a raw material of the coating layer 22, are used as the combination to be phase-separated from each other at or near the processing temperature. Examples of the combination to be phase-separated include a combination (a) of a plurality of types of polymers mutually immiscible to be phase-separated, a combination (b) of a polymer and a curable resin precursor immiscible to be phase-separated, or a combination (c) of a plurality of curable resin precursors mutually immiscible to be phase-separated. Among these combinations, typically the combination (a) of a plurality of types of polymers and the combination (b) of a polymer and a curable resin precursor are used, and in particular, the combination (a) of a plurality of types of polymers is preferred.

The coating layer 22 may contain a plurality of dispersed fine particles (fillers). The fine particles may be either organic fine particles or inorganic fine particles, and the plurality of fine particles may contain a plurality of types of fine particles.

The organic fine particles can be exemplified by crosslinked acrylic particles and crosslinked styrene particles. The inorganic fine particles can be exemplified by silica particles and alumina particles. An average particle size of the fine particles is not particularly limited and can be set to a value in a range of, for example, 0.1 µm or greater and 10.0 µm or less. The average particle size is more preferably a value in a range of 0.5 µm or greater and 5.0 µm or less and even more preferably a value in a range of 1.0 µm or greater and 4.0 µm or less.

The average particle size referred to herein is a 50% volume average particle size in the Coulter counter method (the same applies to the average particle size referred to below). The fine particles may be solid or hollow. It should be noted that the fine particles with a too small average particle size may lead to difficulty in achieving anti-glare properties of the light transmission portion 1b, and the fine particles with a too large average particle size may increase the sparkle of the surface of the light transmission portion 1b.

In addition, the co-continuous phase structure formed by the phase separation of the plurality of resin components forms recesses and protrusions on the surface 22a of the coating layer 22, and this eliminates the need for the coating layer 22 to contain fine particles, for example, with a particle size of greater than 3 µm.

The coating layer 22 may contain a commonly used additive within a range that does not impair the optical properties, the additive, such as, for example, organic or inorganic particles, a stabilizer (such as an antioxidant or a UV absorber), a surfactant, a water-soluble polymer, a filler, a crosslinker, a coupling agent, a colorant, a flame retardant, a lubricant, a wax, a preservative, a viscosity modifier, a thickener, a leveling agent, or an antifoaming agent.

MODIFIED EXAMPLES OF COATING LAYER OF ORIGINAL MOLD

Figure 6:
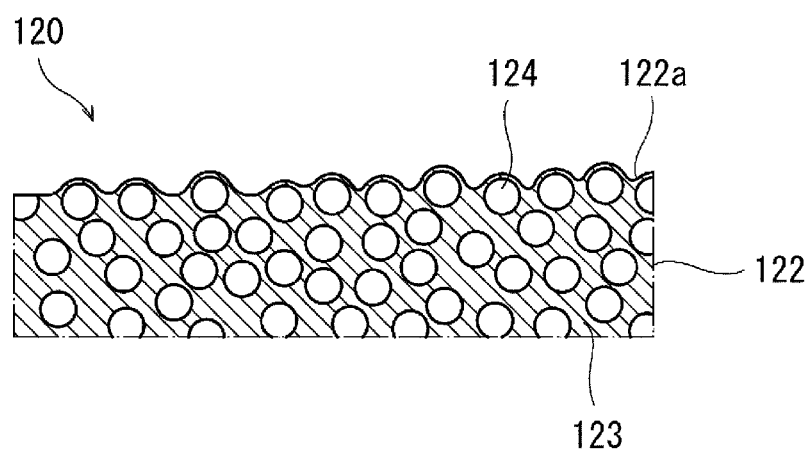
FIG. 6 is a diagram illustrating a coating layer of an original mold according to a modified example of the first embodiment.

FIG. 6 is a diagram illustrating a coating layer 122 of an original mold 120 according to a modified example of the first embodiment. The original mold 120 is, as an example, a film member. FIG. 6 partially illustrates the coating layer 122 of the original mold 120. As illustrated in FIG. 6, the coating layer 122 contains a matrix resin 123 and a plurality of fine particles 124 dispersed in the matrix resin 123.

The fine particles 124 are formed in a perfectly spherical shape, but the shape of the fine particles is not limited to this and may be formed in a substantially spherical or ellipsoidal shape. In addition, the fine particles 124 are formed in a solid form but may be formed in a hollow form. In fine particles 124 formed in a hollow form, the hollow portion of the fine particles may be filled with air or another gas. In the coating layer 122, a plurality of fine particles 124 may be dispersed as primary particles, or a plurality of secondary particles formed by aggregation of a plurality of fine particles 124 may be dispersed.

The fine particles 124 have an average particle size set to a value in a range of 0.1 µm or greater and 10.0 µm or less. The average particle size of the fine particles 124 is more preferably a value in a range of 1.0 µm or greater and 5.0 µm or less and even more preferably a value in a range of 1.0 µm or greater and 4.0 µm or less.

In addition, a variation in the particle size of the fine particles 124 is desirably small. For example, in particle size distribution of the fine particles contained in the coating layer 122, an average particle size of 50 vol. % or more of the fine particles contained in the coating layer 122 is desirably within a variation within 2.0 µm.

The fine particles thus having a relatively uniform particle size and the average particle size set to the above range form uniform and moderate recesses and protrusions on the surface of the coating layer 122. This can prevent the sparkle while providing intended anti-glare properties of the light transmission portion 1b.

A ratio of a weight of the matrix resin 123 and a total weight of the plurality of fine particles 124 in the coating layer 122 can be appropriately set. In the present embodiment, a ratio G2/G1 of a weight G1 of the matrix resin 123 of the coating layer 122 and a total weight G2 of the plurality of fine particles 124 contained in the coating layer 122 is set to a value in a range of 0.02 or greater and 0.40 or less. The ratio G2/G1 is desirably a value in a range of 0.02 or greater and 0.30 or less and more desirably a value in a range of 0.03 and 0.20 or less.

The fine particles 124 dispersed in the matrix resin 123 may be either inorganic or organic but preferably have good transparency. The organic fine particles can be exemplified by plastic beads. The plastic beads can be exemplified by styrene beads (refractive index of 1.59), melamine beads (refractive index of 1.57), acrylic beads (refractive index of 1.49), acrylic-styrene beads (refractive index of 1.54), polycarbonate beads, and polyethylene beads.

The styrene beads may be crosslinked styrene beads, and the acrylic beads may be crosslinked acrylic beads. The plastic beads desirably have a hydrophobic group on the surface. Such plastic beads can be exemplified by styrene beads.

The matrix resin 123 can be exemplified by at least any of a photocurable resin curing by an active energy ray, a solvent-drying resin curing by drying a solvent added during coating, or a thermosetting resin.

The photocurable resins can be exemplified by resins having an acrylate functional group, for example, relatively low molecular weight polyester resins, polyether resins, acrylic resins, epoxy resins, urethane resins, alkyd resins, spiroacetal resins, polybutadiene resins, and polythiol polyene resins; oligomers, such as (meth)acrylates of polyfunctional compounds, such as polyhydric alcohols; prepolymers; and reactive diluents.

By way of specific examples, these photocurable resins can be exemplified by monofunctional monomers, such as ethyl(meth)acrylate, ethylhexyl(meth)acrylate, styrene, methylstyrene, and N-vinylpyrrolidone; and multifunctional monomers, such as, for example, polymethylolpropane tri (meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the photocurable resin is a UV curable resin, a photopolymerization initiator is preferably used. The photopolymerization initiator can be exemplified by acetophenones, benzophenones, Michler's benzoyl benzoate, α-amyloxime ester, tetramethylthiuram monosulfide, and thioxanthones. In addition, a photosensitizer is preferably mixed with the photocurable resin for use. The photosensitizer can be exemplified by n-butylamine, triethylamine, and poly-n-butylphosphine.

The solvent-drying resin can be exemplified by well-known thermoplastic resins. This thermoplastic resin can be exemplified by styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers or elastomers. The solvent-drying resin is desirably a resin soluble in an organic solvent, in particular, a resin excelling in moldability, film formability, transparency, and weather resistance. Such a solvent-drying resin can be exemplified by styrene resins, (meth)acrylic resins, alicyclic olefin resins, polyester resins, and cellulose derivatives (such as cellulose esters).

Here, when the material of the base layer in the original mold 120 contains a cellulosic resin, such as triacetyl cellulose (TAC), a cellulosic resin can be exemplified as a thermoplastic resin used in a solvent-drying resin. This cellulosic resin can be exemplified by cellulose derivatives, such as nitrocellulose, acetyl cellulose, acetyl butyl cellulose, ethyl cellulose, methyl cellulose, cellulose acetate propionate, and ethyl hydroxyethyl cellulose. Using a cellulosic resin as a solvent-drying resin allows the base layer and the coating layer 122 to be favorably and tightly adhered.

In addition, the solvent-drying resin can be additionally exemplified by vinyl resins, acetal resins, acrylic resins, polystyrene resins, polyamide resins, and polycarbonate resins.

The thermosetting resin can be exemplified by phenolic resins, urea resins, diallyl phthalate resins, melamine resins, guanamine resins, unsaturated polyester resins, polyurethane resins, epoxy resins, amino alkyd resins, melamine-urea co-condensed resins, silicon resins, and polysiloxane resins. In using a thermosetting resin as the matrix resin, at least any of a curing agent, such as a crosslinker or a polymerization initiator; a polymerization accelerator; a solvent; or a viscosity modifier may be used in combination.

Such use of the film member having recesses and protrusions formed on the surface by the plurality of fine particles 124 as the original mold 120 allows the recesses and protrusions to be formed on the surface of the light transmission portion 1*b* of the molded article 1 with high precision and ease.

Sparkle Measurement Apparatus

Figure 7:
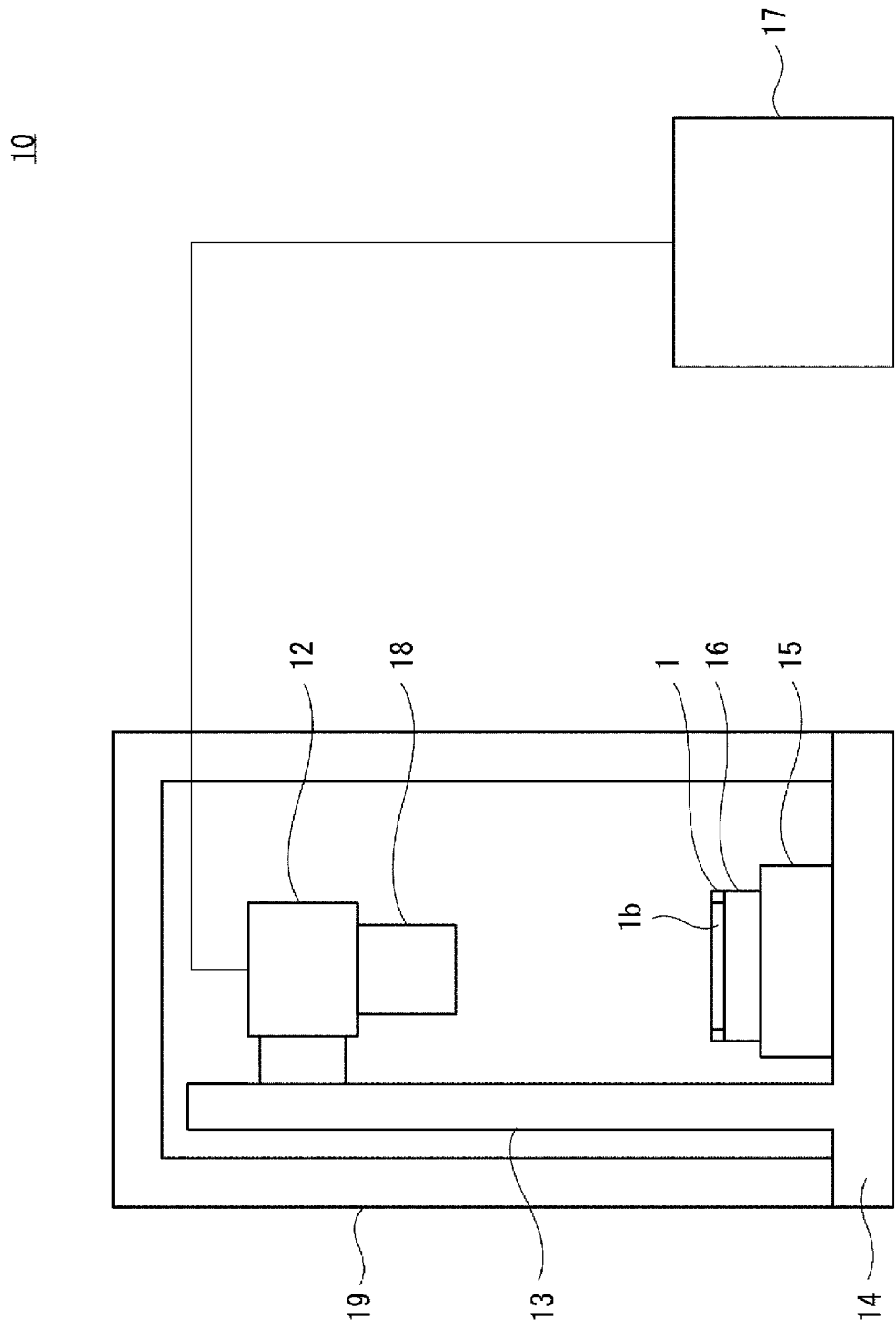
FIG. 7 is a schematic view of a sparkle measurement apparatus.

FIG. 7 is a schematic view of a sparkle measurement apparatus 10. The sparkle measurement apparatus 10 is an apparatus for evaluating the sparkle of the surface of the light transmission portion 1*b*. FIG. 7 schematically illustrates a state in which a portion including the light transmission portion 1*b* of the molded article 1 is cut out and placed.

As illustrated in FIG. 7, the sparkle measurement apparatus 10 includes an enclosure 19, an imaging device 12, a holding portion 13, an imaging device stand 14, a display device stand 15, and an image processing device 17. An example of a commercially available sparkle measurement apparatus 10 is a "Film Sparkle Measurement Apparatus" available from Komatsu NTC Ltd.

The enclosure 19 has a dark room for capturing the image of the surface of the light transmission portion 1*b* by the imaging device 12. The enclosure 19 accommodates the imaging device 12, the holding portion 13, the imaging device stand 14, the display device stand 15, and a display device 16 to be measured.

The imaging device 12 is, as an example, an area camera having a lens 18 and an imaging element. The imaging device 12 captures an image of a display portion of the display device 16 displayed on the surface of the light transmission portion 1*b*. The imaging device 12 is connected to the image processing device 17. The imaging device 12 is held by the holding portion 13, thus allowing the lens 18 and the light transmission portion 1*b* to face each other. Image data captured by the imaging device 12 is transmitted to the image processing device 17.

The holding portion 13 extends in the vertical direction and holds the imaging device 12 while being fixed to the imaging device stand 14 at the lower end. The holding portion 13 holds the imaging device 12, thus allowing the imaging device 12 to be moved in the vertical direction with respect to the display device 16 and thereby allowing a relative distance between the surface of the light transmission portion 1*b* and the lens 18 to be changed.

The display device 16 is placed on the upper surface of the display device stand 15 in superposition with the light transmission portion 1*b* in a state allowing the surface of the light transmission portion 1*b* to face the imaging device 12. The display device 16 is, as an example, a smartphone with a resolution of 441 ppi (here, Galaxy S4 available from Samsung Electronics Co., Ltd.). The display device stand 15 supports the display device 16, thus allowing the surface of the light transmission portion 1*b* to face and to be a horizontal plane to the imaging device 12, and moves the display device 16 in the vertical direction with respect to the imaging device 12.

In the sparkle measurement apparatus 10, a pixel size of an image displayed on the surface of the light transmission portion 1*b*, the image to be captured per unit pixel (e.g., one pixel) of the imaging element of the imaging device 12, is adjusted by adjusting a relative distance between the imaging device 12 and the surface of the light transmission portion 1*b*.

The image processing device 17 processes the image data captured by the imaging device 12. Specifically, the image processing device 17 determines a standard deviation of luminance on the surface of the light transmission portion 1*b* from the image data captured by the imaging device 12.

The image processing device 17 of the present embodiment includes units, such as an input unit into which image data captured by the imaging device 12 is input, an image processing unit that processes the input image data, and an output unit that outputs a result processed by the image processing unit to a monitor, a printing device, or the like.

The method for adjusting the pixel size of an image to be captured per unit pixel (e.g., one pixel) of the imaging element when an image of the display device 16 displayed on the surface of the light transmission portion 1*b* is captured by the imaging device 12 may be a method of changing a focal length of the imaging device 12 when the lens 18 included in the imaging device 12 is a zoom lens, in addition to the method of changing the relative distance between the imaging device 12 and the surface of the light transmission portion 1*b*.

Evaluation Method of Sparkle

Next, an evaluation method of sparkle of the surface of the light transmission portion 1*b* using the sparkle measurement apparatus 10 will be described. In this method, for convenience, the display portion of the display device 16 is illuminated uniformly in a single color (as an example, green) in advance to display.

Next, an operator carries out adjusting to adjust the pixel size of the display device 16, the pixel size to be captured per unit pixel of the imaging element of the imaging device 12 through the light transmission portion 1*b*. In the adjusting, the relative distance between the imaging device 12 and the surface of the light transmission portion 1*b* is adjusted, according to the number of effective pixels of the imaging element of the imaging device 12, to an extent that no emission line due to the pixel is present in the image captured by the imaging device 12, or an emission line due to the pixel, if present, does not affect the evaluation of the sparkle of the surface of the light transmission portion 1*b*.

The relative distance between the imaging device 12 and the light transmission portion 1*b* is desirably set by taking into account the usage mode of the light transmission portion 1*b* (e.g., the relative distance between user's eyes and the surface of the light transmission portion 1*b*).

After carrying out the adjusting, setting is carried out to set a measurement area to evaluate the sparkle of the light transmission portion 1*b*. In the setting, the measurement area is appropriately set according to, for example, an area of the light transmission portion 1*b*.

After carrying out the adjusting, imaging is carried out to capture an image of the measurement area of the light transmission portion 1*b* by the imaging device 12. The image data captured in the imaging is input into the image processing device 17.

After the imaging, the image processing device 17 carries out calculating to determine a variation in luminance in the measurement area of the light transmission portion 1*b*. In this calculating, the variation in luminance is quantified as a standard deviation of the luminance distribution.

Here, the larger the variation in the luminance of the light transmission portion 1*b*, the larger the sparkle of the surface of the light transmission portion 1*b*. Thus, it can be quantitatively evaluated that the smaller the value of the standard deviation of the luminance distribution, the smaller the sparkle of the surface of the light transmission portion 1*b*.

In addition, in the adjusting, the emission line of the light transmission portion 1*b* is adjusted to the extent of not affecting the evaluation of the sparkle of the surface of the light transmission portion 1*b*. Thus, this reduces luminance unevenness due to the emission line, allowing exact evaluation of the sparkle of the surface of the light transmission portion 1*b*. Through each of the procedures described above, the standard deviation of the luminance distribution of the light transmission portion 1*b* is determined, and this allows the evaluation of the sparkle of the surface of the light transmission portion 1*b* based on the standard deviation value.

In addition, if it is difficult to place the light transmission portion 1*b* in the enclosure 19 of the sparkle measurement apparatus 10, the sparkle of the surface of the light transmission portion 1*b* may be evaluated by preparing a test piece by casting the surface shape of the light transmission portion 1*b* using a transparent resin material or the like, and evaluating the sparkle of the surface of this test peace. Hereinafter, a second embodiment will be described focusing on differences from the first embodiment.

Second Embodiment

Figure 8:
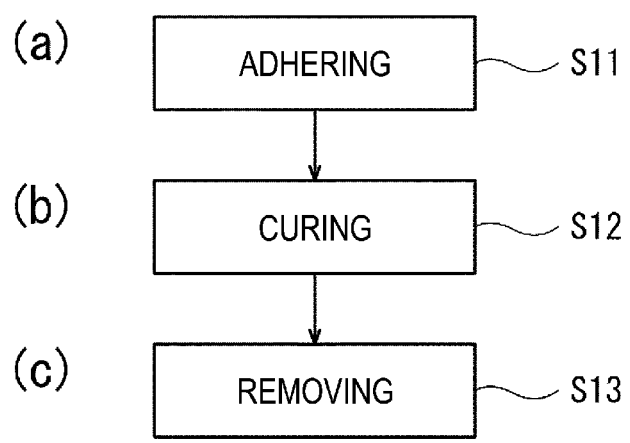
FIG. 8 is a manufacturing flow diagram for a molded article according to a second embodiment.
Figure 9A:
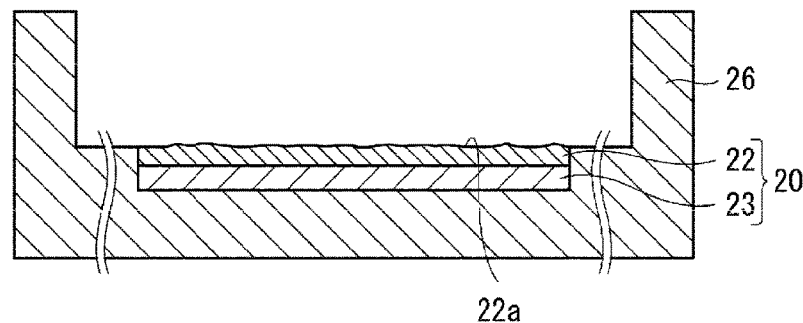
FIGS. 9A to 9C are diagrams illustrating a method for manufacturing the molded article according to the second embodiment.
Figure 9B:
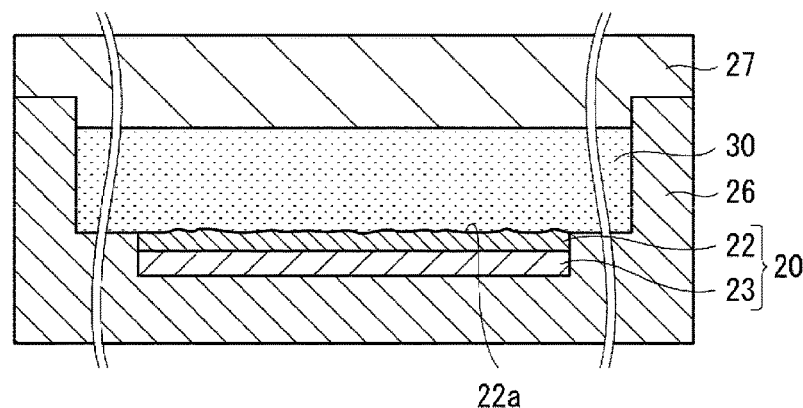
Figure 9C:
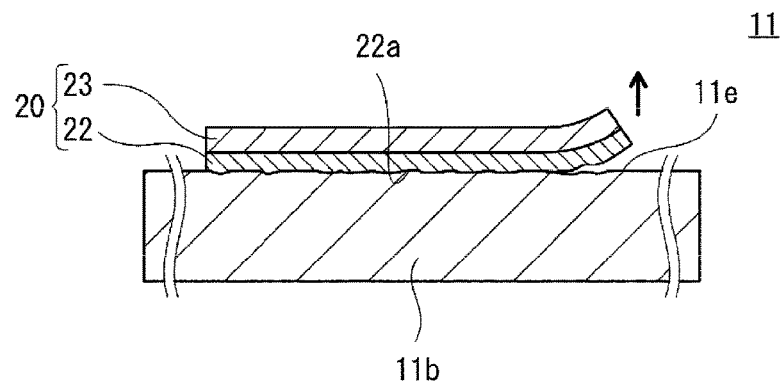

FIG. 8 is a manufacturing flow diagram for a molded article according to a second embodiment. FIGS. 9A to 9C are diagrams illustrating a method for manufacturing the molded article according to the second embodiment. As illustrated in FIG. 8, the method for manufacturing the molded article of the second embodiment includes adhering S11, curing S12, and removing S13.

In the adhering S11, an uncured material is adhered to a surface 22*a* of an original mold 20, in which recesses and protrusions are formed on the surface 22*a* and thus the surface 22*a* has anti-glare properties. In the curing S12, the uncured material adhered to the surface 22*a* of the original mold 20 is cured to form a molded article 11 including a light transmission portion 11*b* disposed in superposition with a display portion 2*a* of a display device 2, the light transmission portion 11*b* transmitting light from the display portion 2*a* and having a surface to which a shape of the surface 22*a* of the original mold 20 is transferred. In the removing S13, the molded article 11 is removed from predetermined molds 20, 26, and 27.

Specifically, the operator first prepares an original mold 20 similar to that of the first embodiment and disposes it inside a first mold 26. At this time, the original mold 20 is disposed with the surface 22*a* directed toward the internal space of the first mold 26 (FIG. 9A).

Next, the operator disposes a second mold 27 in combination with the first mold 26. In this state, a thermoplastic resin 30 in a molten state (uncured material) is injected into the inside of the molds 26 and 27 to bring the thermoplastic resin 30 into contact with the original mold 20. The thermoplastic resin 30 is molded with the molds 26 and 27 (FIG. 9B). The thermoplastic resin 30 cools and hardens to form the molded article 11 including the light transmission portion 11*b*.

As described above, the adhering S11 is carried out to adhere the thermoplastic resin 30 to the surface 22*a* of the original mold 20, in which recesses and protrusions are formed on the surface 22*a* and thus the surface 22*a* has anti-glare properties. In addition, the curing S12 is carried out to cure the thermoplastic resin 30 adhered to the surface 22*a* of the original mold 20 to form the molded article 11 including the light transmission portion 11*b*.

Next, the operator removes the molded article 11 from inside the molds 26 and 27. At this time, the shape of the surface 22*a* of the original mold 20 is transferred to the surface 11*e* of the molded article 11, the surface 11*e* on which the surface 22*a* of the original mold 20 has been adhered.

The operator peels off to remove the original mold 20 from the surface 11*e* of the molded article 11 (FIG. 9C). The removing S13 is thus carried out to remove the molded article 11 from the molds 20, 26, and 27. The manufacturing method described above provides the molded article 11 including the light transmission portion 11b having a surface shape that is a negative pattern to the surface shape of the original mold 20.

As described above, according to the manufacturing method of the second embodiment, the molded article 11 including the light transmission portion 11b having a surface to which a shape of the surface 22a of the original mold 20 is transferred can be manufactured relatively easily by adhering the uncured material to the surface 22a of the original mold 20 having anti-glare properties on the surface and curing the uncured material. In particular, different from the first embodiment, the molded article 11 can be obtained directly from the original mold 20 without using the master mold 25 and the laminated member 28, and thus the molded article 11 can be manufactured quickly and at low cost.

In addition, the molded article 11 thus manufactured is disposed to position the surface of the light transmission portion 11b, having anti-glare properties, on an opposite side to the display portion 2a of the display device 2, and this can achieve similar effects to those of the molded article 1 described above.

Furthermore, in the second embodiment, the master mold 25 may be used instead of the original mold 20. The master mold 25 is disposed with its surface 25a directed toward the interior space of the first mold 26. In this case, the molded article 11 including the light transmission portion 11b having a surface shape that is a positive pattern to the surface shape of the original mold 20 is obtained.

Third Embodiment

Figure 10:
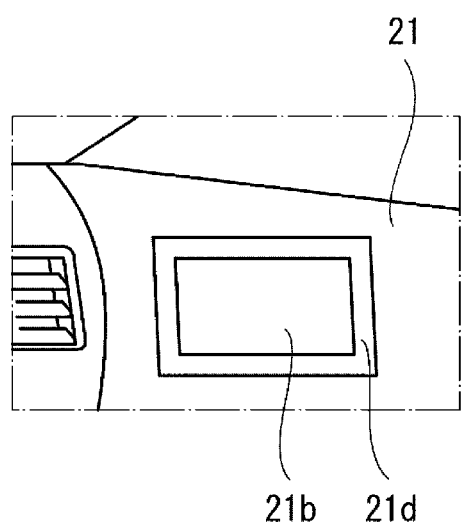
FIG. 10 is an external view of a molded article according to a third embodiment.

FIG. 10 is an external view of a molded article 21 according to a third embodiment. As illustrated in FIG. 10, the molded article 21 is an interior component (side panel) of a door of an automobile. The molded article 21 has a light transmission portion 21b. A display portion of a display device is disposed in superposition with the light transmission portion 21b. This display portion functions as a monitor displaying the rear of the outer side in the vehicle width direction of the automobile. That is, the display portion replaces a rearview mirror known in the art.

The periphery of the light transmission portion 21b is surrounded by the frame-shaped portion 21c. The surface of the light transmission portion 21b is smoothly continuous with the surface of the frame-shaped portion 21c. In other words, the surface of the light transmission portion 21b is seamlessly connected to the surface of the molded article 21 (the surface of the frame-shaped portion 21c) adjacent to the light transmission portion 21b.

Also in such a molded article 21, the surface of the light transmission portion 21b has anti-glare properties, and thus this can prevent difficulty due to external light in viewing a display content of the display device, the display content displayed through the light transmission portion 21b, when the external light impinges on the surface of the light transmission portion 21b. In addition, the surface of the light transmission portion 21b is smoothly continuous with the surface of the molded article 21 adjacent to the light transmission portion 21b, and thus this improves the appearance quality in the light transmission portion 21b and the peripheral region of the light transmission portion 21b of the molded article 21.

Fourth Embodiment

Figure 11:
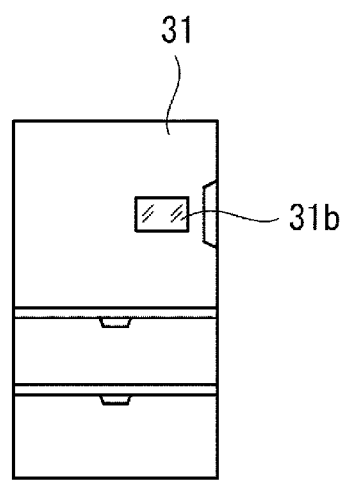
FIG. 11 is an external view of a molded article according to a fourth embodiment.

FIG. 11 is an external view of a molded article 31 according to a fourth embodiment. As illustrated in FIG. 11, the molded article 31 is a component of a home electric appliance (as an example, a door of a refrigerator) and includes a light transmission portion 31b disposed in a portion of the molded article 31. A display device is disposed inside the molded article 31. A display portion of the display device is disposed in superposition with the light transmission portion 31b.

Also in such a molded article 31, the surface of the light transmission portion 31b has anti-glare properties, and thus this can prevent difficulty due to external light in viewing a display content of the display device, the display content displayed through the light transmission portion 31b, when the external light impinges on the surface of the light transmission portion 31b. In addition, when the molded article 31 is a component of a refrigerator, the light transmission portion 31b may be included in an enclosure of the refrigerator.

The present invention is not limited by the embodiments, and the configuration and the method of the present invention can be changed, added, or deleted, without departing from the spirit of the present invention. On the surface of the original mold having anti-glare properties, recesses and protrusions may be formed by sandblasting.

In addition, the molded article is not limited as long as the molded article has a light transmission portion disposed in superposition with the display portion of the display device. When the molded article is disposed in an automobile, the molded article may be a component of a dashboard, an interior component of a door, and any other component, such as a center console. Furthermore, the molded article needs to have a light transmission portion in at least a portion of the region, and, for example, the light transmission portion may be formed in the entire molded article.

INDUSTRIAL APPLICABILITY

As described above, an embodiment of the present invention has an excellent effect, in the molded article including the light transmission portion transmitting light from a display device, of preventing the difficulty due to external light in viewing a display content of the display device, the display content displayed through the light transmission portion. It is thus advantageous to widely apply an embodiment of the present invention to molded articles and methods for producing molded articles that can exhibit the significance of this effect.

REFERENCE SIGNS LIST

S1 Casting
S2, S11 Adhering
S3, S12 Curing
1, 11, 21, 31 Molded article
1b, 11b, 21b, 31b Light transmission portion
2 Display device
2a Display portion
8, 30 Uncured material
20, 120 Original mold
25 Master mold
26 First mold (mold)
27 Second mold (mold)
28 Laminated member
123 Matrix resin
124 Fine particles

The invention claimed is:

1. A resin molded article comprising:
   a light transmission portion, in which recesses and protrusions are formed directly on one surface and thus the surface has anti-glare properties; and
   a frame-shaped portion disposed adjacent to the light transmission portion to surround the surface of the light transmission portion and colored; wherein
   the surface of the light transmission portion and the surface of the frame-shaped portion are smoothly continuous.

2. The resin molded article according to claim 1, wherein a center line average surface roughness on the surface of the light transmission portion is set to a value in a range of 0.01 μm or greater and 2.0 μm or less.

3. The resin molded article according to claim 1, wherein an average peak-valley interval on the surface of the light transmission portion is set to a value in a range of 1 μm or greater and 500 μm or less.

4. The resin molded article according to claim 1, wherein an average inclination angle on the surface of the light transmission portion is set to a value in a range of 0.001° or greater and 10° or less.

5. The resin molded article according to claim 1, wherein a haze value on the surface of the light transmission portion is set to a value in a range of 0.5% or greater and 95% or less.

6. The resin molded article according to claim 1, wherein a maximum thickness dimension of the light transmission portion is set to a value in a range of 0.2 mm or greater and 50 mm or less.

7. The resin molded article according to claim 1, wherein an absolute value of skewness on the surface of the light transmission portion is set to a value of 3 or less, and the kurtosis on the surface of the light transmission portion is set to a value of 10 or less.

8. The resin molded article according to claim 1, comprising:
   a laminated member comprising an anti-glare layer, the anti-glare layer comprising a surface having anti-glare properties; and a base layer disposed opposite to the surface of the anti-glare layer; and
   a base member disposed in superposition on the base layer side of the laminated member; wherein
   the surface of the anti-glare layer is the surface of the light transmission portion, and at least the light transmission portion is a film insert molded portion, the film insert molded portion being an integrally molded portion of the base member and the laminated member.

9. A disposed structure comprising the resin molded article described in claim 1 and a display device comprising a display portion, wherein
   the display portion is disposed in superposition with the light transmission portion to transmit light from the display portion of the display device.

10. The disposed structure according to claim 9, wherein the display device comprises a plurality of pixels located side by side along the surface of the display portion, and
    a standard deviation of a luminance distribution of the light transmission portion is set to a value in a range of 3 or greater and 25 or less.

11. A method for manufacturing a resin molded article, the method comprising:
    casting a surface of an original mold to form a master mold, recesses and protrusions being formed on the surface of the original mold and thus the surface having anti-glare properties;
    adhering to mold a thermoplastic resin integrally with an uncured material in a state of disposing a base layer and the uncured material superposed with one surface of the base layer to be adhered to the surface of the master mold; and
    curing the uncured material and the thermoplastic resin to form a light transmission portion, in which the recesses and protrusions of the master mold are transferred to one surface and thus the surface has anti-glare properties, and a frame-shaped portion disposed adjacent to the light transmission portion to surround the surface of the light transmission portion and colored, and thus the surface of the light transmission portion and the surface of the frame-shaped portion are smoothly continuous.

12. The method for manufacturing a resin molded article according to claim 11, wherein, in the adhering, the master mold is disposed inside a mold, and the thermoplastic resin is injected into the inside of the mold to mold the thermoplastic resin integrally with the uncured material.

13. The method for manufacturing a resin molded article according to claim 11, wherein, in the adhering, the thermoplastic resin is injected into the inside of the mold from an opposite side to the master mold side of the laminated member to mold the thermoplastic resin.

14. A method for manufacturing a resin molded article, the method comprising:
    casting a surface of an original mold to form a master mold, recesses and protrusions being formed on the surface of the original mold and thus the surface having anti-glare properties;
    adhering an uncured material to a surface of the master mold; and
    curing the uncured material adhered to the surface of the master mold to form a resin molded article comprising a light transmission portion having a surface to which a shape of the surface of the master mold is transferred; wherein
    in the adhering, in a state of disposing the master mold inside a mold and disposing a laminated member comprising a base layer and a coating layer disposed in superposition with one surface of the base layer, the coating layer containing the uncured material, the laminated member being a separate body from the master mold, to adhere the coating layer to the surface of the master mold, and thus the uncured material being adhered to the surface of the master mold, a thermoplastic resin is injected into the inside of the mold from an opposite side to the master mold side of the laminated member to mold the thermoplastic resin integrally with the laminated member, and
    in the curing, the light transmission portion is formed by the laminated member and the thermoplastic resin.

15. The method for manufacturing a resin molded article according to claim 11, a film member having an anti-glare property on one surface is used as the original mold.

16. The method for manufacturing a resin molded article according to claim 15, the film member containing a plurality of resin components and comprising a co-continuous phase structure formed by phase separation of the plurality of resin components is used.

17. The method for manufacturing a resin molded article according to claim 14, the film member containing a matrix resin and a plurality of fine particles dispersed in the matrix resin is used.

18. The method for manufacturing a resin molded article according to claim 11, wherein the uncured material contains a thermosetting resin material.

19. The method for manufacturing a resin molded article according to claim 11, wherein the uncured material contains a photocurable resin material.

\* \* \* \* \*